Oct. 18, 1955   D. W. MORRIS   2,720,794
CONNECTING ROD AND BEARING ASSEMBLY
Filed June 23, 1952   2 Sheets-Sheet 1

DONALD W. MORRIS
INVENTOR.

BY
Mellin and Hanscom
ATTORNEYS

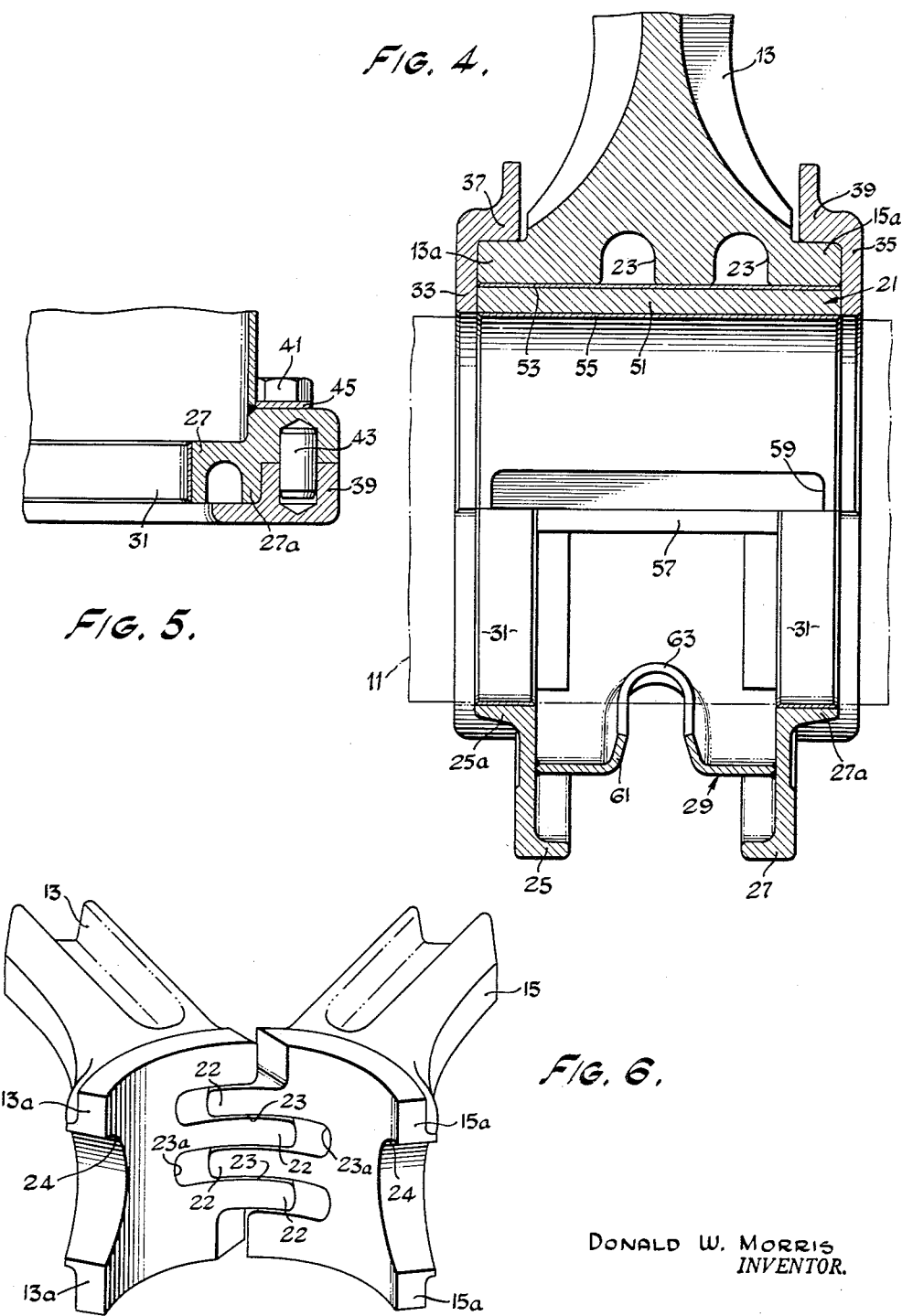

United States Patent Office 2,720,794
Patented Oct. 18, 1955

2,720,794

CONNECTING ROD AND BEARING ASSEMBLY

Donald W. Morris, Berkeley, Calif., assignor to Morris Development Company, Los Angeles, Calif., a copartnership Application June 23, 1952, Serial No. 295,019

4 Claims. (Cl. 74—580)

This invention relates to internal combustion engines of the V-cylinder arrangement, and particularly to parts and assemblies thereof.

A principal object of the present invention is to provide an improved connecting rod having its crank pin end so formed that two of such rods, identical in formation, but reversely disposed relative to one another, can be coplanarly mounted on a common crank pin with circumferentially extending portions of one slidably interengaging circumferentially extending portions of the other.

Another principal object of the present invention is to provide an assemblage comprising a bearing box designed to be mounted on a crank pin, and oscillatively receiving a pair of coplanarly disposed connecting rods retained against separation from the bearing box, said connecting rods being so formed as to be free from any cocking tendencies.

Another object of the present invention is to provide an assembly as above described having special design features to facilitate lubrication of the bearing box, connecting rods, and the crank pin on which the assembly is mounted.

A further object of the present invention is to provide an improved crank pin bearing box.

Various other objects of the present invention will be apparent from the following description taken in connection with the accompanying drawings, wherein:

Fig. 4 is a sectional view taken along line 4—4 of Fig. 3.

Fig. 5 is a fragmentary sectional view taken along line 5—5 of Fig. 3, showing the dowel pin connection between a retainer and a bearing member.

Fig. 6 is a perspective view showing more clearly the interengagement between the crank pin ends of the pair of connecting rods.

Figure 1:
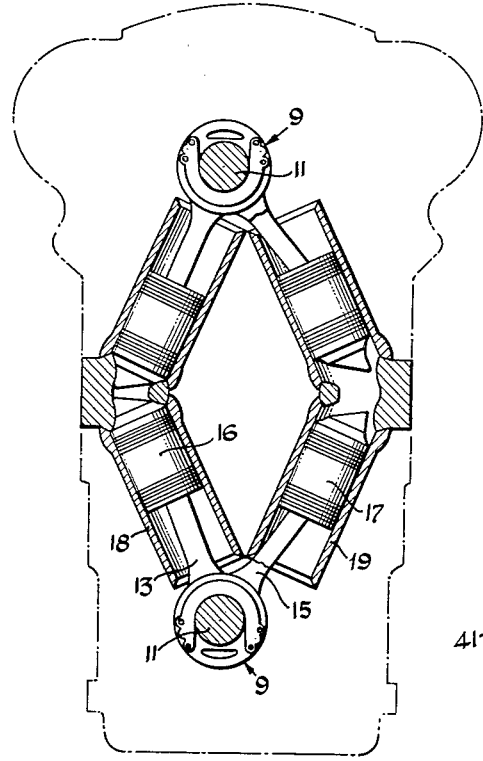
Fig. 1 is a diagrammatic view of an engine embodying the concepts of the present invention, having its cylinders arranged in a diamond formation.

Referring to the accompanying drawings, wherein similar reference characters designate similar parts throughout, Fig. 1 discloses, diagrammatically, an engine in which the parts and assemblages of the present invention are incorporated. The type of engine shown is similar to that shown in my prior patent for "Internal-Combustion Engine," No. 2,507,923. My prior patent relates to a diesel engine, and although the concepts of the present invention are ideally suited for incorporation in a diesel engine, the invention is not intended to be limited thereto unless so designated in the claims appended to this specification. Furthermore, the particular disclosure of a diamond formation of the cylinders is not intended to be a limitation, since the concepts of the present invention have direct application to V-type engines in general.

It is immediately apparent from Fig. 1 that the cylinders are coplanarly arranged, and manifestly it is extremely desirable that the connecting rod be coplanarly arranged. The present invention allows such a coplanar disposition of the connecting rods, and the mounting of the crank pin ends of the connecting rods on a common crank pin, yet, without any tendency of the connecting rods to cock.

Figure 2:
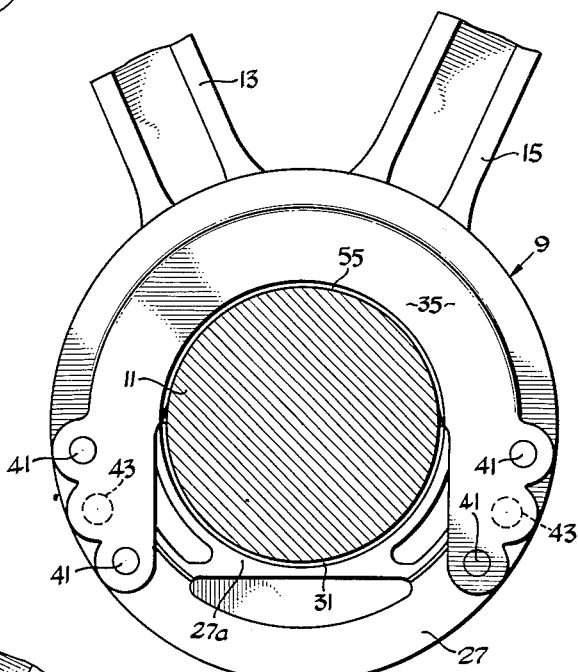
Fig. 2 is an enlarged end elevational view of a connecting rod and bearing box assembly embodying the concepts of the present invention, the assembly being mounted on a crank pin, and only the crank pin ends of the connecting rods being shown for convenience in illustration.
Figure 3:
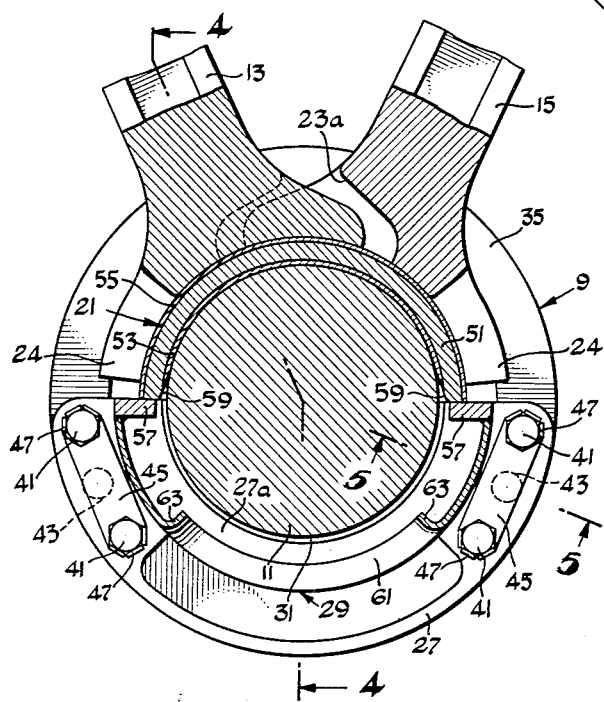
Fig. 3 is a mid-sectional end elevational view of the assembly disclosed in Fig. 2.

In Figs. 2, 3 and 4, there is disclosed an assemblage comprising a bearing box 9 rotatably mounted on a crank pin 11, which forms a part of the lower crankshaft of the engine disclosed in Fig. 1. Oscillatively received by box 9 is a pair of connecting rods 13 and 15, said rods being connected at their opposite ends to pistons 16 and 17, respectively, which are contained within cylinders 18 and 19, respectively. The upper set of cylinders and pistons, connecting rods and crankshaft are assumed to be generally similar in construction, although it is pointed out that cylinders 18 and 19 in the type of engine disclosed in my patent above identified are exhaust cylinders, whereas the upper cylinders are intake cylinders. This particular distinction has no important bearing on the present invention.

Connecting rods 13 and 15 are identical in formation, but reversely disposed relative to one another. The crank pin ends of these connecting rods are adapted to bear against a bearing shell 21 to be described more in detail hereinafter. The above mentioned ends of the connecting rods have circumferentially extending toes 22 in slidable interengagement with one another as shown in Fig. 6. Toe-receiving recesses are provided in each rod end for the reception of the toes of the opposite rod end, the recesses being generally designated by the reference numeral 23 and being formed in part by the extension of the toes away from the shank portion of a connecting rod and in part by relieving the rod end into the shank portion as best shown in Fig. 3 at 23a.

As is apparent from Fig. 6, the toes on each rod end, considered together or as a unit, are offset from the centerline of the connecting rod a distance equal to the offsetting of its toe-receiving recesses on the other side of the centerline of the connecting rod, and therefore, the rod ends are identical in construction though reversely positioned relative to one another. The advantages of this construction will be pointed out hereinafter. Each connecting rod also has a heel portion 24 extending circumferentially in the opposite direction from the toe portions of the rod, to provide increased bearing area for bearing engagement with sleeve 21.

Bearing box 9 includes a pair of semi-circular bearing members 25 and 27 rigidly spaced from one another by a centerpiece 29, which is fixedly secured to the bearing members by welding or equivalent means. The bearing members have considerable radial depth as is apparent from Fig. 4 to give them considerable strength in this direction. The bearing members have outwardly extending flanges 25a and 27a providing inwardly directed arcuate faces having applied thereto a layer of bearing material 31 such as babbitt. The bearing faces thus provided are disposed in direct engagement with crank pin 11 and maintained in such engagement by a pair of retainers 33 and 35.

Each retainer 33 and 35 is of generally U-shape, and is apparent from Fig. 4 the retainers have inwardly extending flanges 37 and 39 overlying outwardly extending flanges 13a and 15a formed on the connecting rods, see Fig. 4 for the flanges of 13a of connection rod 13. The retainers may conveniently be formed of steel forgings carburized and hardened and ground at the surfaces thereof contacting the connecting rods.

The ends of retainers 33 and 35 have their flanges 37 and 39 in engagement with flanges 25a and 27a of bearing members 25 and 27, which is best appreciated by reference to Fig. 5 which shows the overlapping relationship between flange 39 of retainer 35 and flange 27a of bearing member 27. The ends of retainers 33 and 35 are secured to bearing members 25 and 27, respectively, by cap screws 41 and dowels 43, said cap screws extending through clearance holes formed in the bearing members and being threadedly received by said retainers. Dowels 43 are received by bores formed in the retainers and bearing members as shown in Fig. 5, to accurately locate the parts relative to one another in order to provide proper fitting of flanges 37 and 39 against flanges 13 and 15a, proper fitting between the bearing areas of the rod ends and shell 21, between shell 21 and pin 11, and proper fitting of bearing faces 31 of bearing members 25 and 27 against crank pin 11.

Clamped beneath the head of each pair of cap screws is a locking strip 45 having its opposite ends split and bent upwardly at 47, after the cap screws are tightened in place, to prevent unscrewing of said screws.

Bearing shell 21, previously mentioned, is generally semi-cylindrical in shape and may comprise a steel body portion 51 having its concave and convex surfaces lined with bearing material. Since the main thrust of the pistons, connected to the connecting rods, will be taken by the bearing shell, it is contemplated some special lining material will be utilized in cases where the load is heavy. For instance, the outer lining designated by the reference numeral 53, may be SAE 64 bronze, and the inner lining 55 may be a copper lead, babbit, or other bearing composition. Optionally, the shell may be formed of SAE 64 bronze and merely lined with a facing of a tin base babbitt.

Shell 21 at its circumferential ends bears against stop plates 57, which are rigidly secured such as by welds to central piece 29 and to bearing members 25 and 27, see Figs. 3 and 4. Shell 21 is preferably relieved at 59 to insure proper movement thereof relative to crank pin 11 and also to insure proper lubrication. Shell 21 has an axial length such as to fit between retainers 33 and 35 as is apparent from Fig. 4.

In order to lubricate the assemblage thus provided, centerpiece 29 has an elongated opening 61 formed therein by inturned lips 63 of said centerpiece, which lips form a receptacle or cavity for trapping oil. Crank pin 11 is exposed by opening 61 so that oil can be jetted (by means not shown) directly through opening 61 onto the crank pin. The receptacle or cavity formed by inturned lips 63 will entrap the splash from the oil jetting against the crank pin and reserve a supply for insuring proper lubrication of the parts. During rotation of the crank pin centrifugal force will force or shoot the oil collected by the cavity or receptacle to the leading edge of the crank pin bearing. Preferably, several small holes, through the bearing shell to the convex surface thereof, are provided so that the oil by pumping action will pass through the openings to the convex surface. Preferably, the convex surface of the bearing shell is longitudinally grooved.

By the present invention, a novel assemblage, a novel connecting rod and a novel bearing box have been provided. The connecting rod so provided has its crank pin end so formed as to permit coplanar disposition thereof with a similar connecting rod, and hence permit the cylinders, which contain the pistons which are connected to the coplanarly disposed connecting rods, to be coplanarly disposed with respect to one another, and with the connecting rods and cylinders in the same plane, the engine is shorter, lighter, and more rigid than when utilizing a side by side arrangement of the connecting rods. By having the connecting rods identical in construction, manufacturing expenses and problems are greatly decreased, inventory is cut in approximately half, and servicing of the connecting rods is facilitated. Further, since the rod ends have a substantial circumferential engagement with the bearing shell there is no tendency for the rods to cock during their movement even though they are coplanarly disposed. Another advantage of the specific rod end construction disclosed is that greater bearing areas are obtained than exist in side by side type connecting rods. Further, the connecting rods of the present invention are lighter and easier to manufacture than fork and blade, or master and link rod design. The interengaging toe construction of the connecting rods distributes the firing pressure over the surface of the crank pin bearing surface to almost the full projected area of the toes and heels. It is pointed out that the toe design does not affect the oscillating load carrying capacity of the connecting rods, as continuity of surface is not required by oscillating bearing surfaces.

The bearing box provided by the present invention is simple and inexpensive in construction and yet strong and sturdy to an extent commensurate with the stresses to which it is to be subjected. Great strength is not required of the box as it acts only as a connecting rod and bearing retainer. The bearing box is also constructed, as previously described, so as to permit ready lubrication of the crank pin, of the bearing shell, and the other parts.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A bearing box comprising a pair of parallel semi-circular bearing members connected together in lateral spaced relationship, a pair of U-shaped connecting rod end retainers each having its open ends fixedly secured to one of the bearing members and each having an inwardly directed flange for overlying engagement with a connecting rod end, a removable semi-cylindrical bearing shell contained between the retainers, and abutments fixed to the bearing members and against which the circumferential ends of the bearing shell abut.

2. In combination, a bearing box comprising a pair of parallel semi-circular bearing members connected together in lateral spaced relationship, a pair of U-shaped connecting rod end retainers each having its open ends fixedly secured to one of the bearing members and each having an inwardly directed flange for overlying slidable engagement with connecting rod ends, a removable semi-cylindrical bearing shell contained between the retainers and adapted for direct bearing engagement with a crank pin, and a pair of connecting rods having ends disposed in engagement with the shell and each rod having outwardly extending flanges underlying the flanges on the retainers, said rods being coplanarly disposed and having interengaging circumferentially extending portions.

3. In combination, a bearing box comprising a pair of parallel semi-circular bearing members connected together in lateral spaced relationship, a pair of U-shaped connecting rod end retainers each having its open ends fixedly secured to one of the bearing members and each having an inwardly directed flange for overlying slidable engagement with connecting rod ends, a removable semi-cylindrical bearing shell contained between the retainers and adapted for direct bearing engagement with a crank pin, and a pair of connecting rods having ends disposed in engagement with the shell and each rod having outwardly extending flanges underlying the flanges on the retainers, said rods being coplanarly disposed and having interengaging circumferentially extending portions, the rod end of one rod being identical but oppositely disposed relative to the rod end of the other rod.

4. In combination, a bearing box comprising a pair of semi-circular bearing members connected together in lateral spaced relationship by a separate centerpiece welded to the bearing members, connecting rod retainers fixedly secured to the bearing members and having inwardly directed flanges for slidably engaging connecting rod ends, a removable semi-cylindrical bearing shell contained between the retainers and adapted for direct bearing engagement with a crank pin, a pair of connecting rods having ends disposed in engagement with the bearing shell, each rod having outwardly extending flanges underlying the flanges on the retainers, said rods being coplanarly disposed and having interengaging circumferentially extending portions, the rod end of one rod being identical to but oppositely facing the rod end of the other rod, abutments fixed to the bearing members and against which the circumferential ends of the bearing shell abut, said separate centerpiece having an opening therethrough for exposing a portion of the crank pin, and a trap formed around the opening for entrapping a supply of oil.

References Cited in the file of this patent

UNITED STATES PATENTS

| | | |
|---|---|---|
| 1,250,950 | Bolton | Dec. 25, 1917 |
| 1,800,611 | Eiane | Apr. 14, 1931 |
| 1,837,825 | Mead | Dec. 22, 1931 |
| 2,050,723 | McMillin | Aug. 11, 1936 |
| 2,096,189 | Miller | Oct. 19, 1937 |
| 2,318,954 | Miller | May 11, 1943 |
| 2,552,662 | Barlow | May 15, 1951 |
| 2,608,108 | Knight | Aug. 26, 1952 |